(12) United States Patent
Bookstaff

(10) Patent No.: US 7,720,828 B2
(45) Date of Patent: May 18, 2010

(54) METHOD AND SYSTEM FOR AUTOMATED INTELLIGENT ELECTRONIC ADVERTISING

(76) Inventor: Blake Bookstaff, 205 Mohican St., Knoxville, TN (US) 37919

(*) Notice: Subject to any disclaimer, the term of this patent is extended or adjusted under 35 U.S.C. 154(b) by 52 days.

(21) Appl. No.: 11/170,263

(22) Filed: Jun. 29, 2005

(65) Prior Publication Data
US 2005/0289113 A1 Dec. 29, 2005

Related U.S. Application Data

(60) Provisional application No. 60/583,960, filed on Jun. 29, 2004.

(51) Int. Cl.
*G06F 7/00* (2006.01)
(52) U.S. Cl. .................. 707/705; 707/706; 709/203
(58) Field of Classification Search .................. None
See application file for complete search history.

(56) References Cited

U.S. PATENT DOCUMENTS

| | | | |
|---|---|---|---|
| 5,377,354 A | 12/1994 | Scannell | |
| 5,892,820 A | 4/1999 | Armstrong | |
| 6,310,948 B1 | 10/2001 | Nemeth | |
| 6,327,343 B1 * | 12/2001 | Epstein et al. | 379/88.01 |
| 6,393,423 B1 * | 5/2002 | Goedken | 707/10 |
| 6,526,440 B1 | 2/2003 | Bharat | |
| 6,529,903 B2 | 3/2003 | Smith | |
| 6,556,983 B1 * | 4/2003 | Altschuler et al. | 706/55 |
| 6,587,549 B1 * | 7/2003 | Weik | 379/93.24 |
| 6,615,209 B1 | 9/2003 | Gomes | |
| 6,633,850 B1 | 10/2003 | Gabbard | |
| 6,658,423 B1 | 12/2003 | Pugh | |
| 6,668,281 B1 * | 12/2003 | Ayyadurai | 709/223 |
| 6,678,681 B1 | 1/2004 | Brin | |
| 6,754,873 B1 | 6/2004 | Law | |
| 6,839,702 B1 | 1/2005 | Patel | |
| 6,845,009 B1 | 1/2005 | Whitted | |

(Continued)

FOREIGN PATENT DOCUMENTS

EP 1 662 366 A1 5/2002

(Continued)

OTHER PUBLICATIONS

Webwasher Corn AG (Mar. 28, 2000), XP-002156461: Siemens-Backed WebWasher Empowers Companies to Remove Unwanted Web Content and Ensure Privacy Protection, Internet Citation, URL:http://www.seomoz.org/blocidetail.php?1, 2 pages.

(Continued)

*Primary Examiner*—Don Wong
*Assistant Examiner*—Shyue Jiunn Hwa
(74) *Attorney, Agent, or Firm*—Lesavich High-Tech Law Group, P.C.; Stephen Lesavich

(57) ABSTRACT

A method and system for automated intelligent electronic advertising. The method and system parse electronic information messages (e.g., e-mail messages, instant messages, etc.) for keywords and make search engine queries or database queries for electronic links based on the identified keywords. The electronic links returned from search engine queries or database queries are added to the electronic information messages creating a modified electronic information message. This allows additional electronic information to be accessed from the modified electronic information message based on information content of the original electronic information message.

29 Claims, 4 Drawing Sheets

U.S. PATENT DOCUMENTS

| | | | |
|---|---|---|---|
| 6,865,575 B1 | 3/2005 | Smith | |
| 6,870,095 B1 | 3/2005 | Whitted | |
| 6,965,919 B1* | 11/2005 | Woods et al. | 709/206 |
| 7,013,323 B1* | 3/2006 | Thomas et al. | 709/203 |
| 2002/0042791 A1 | 4/2002 | Smith | |
| 2002/0123988 A1 | 9/2002 | Dean | |
| 2002/0133481 A1 | 9/2002 | Smith | |
| 2003/0041126 A1 | 2/2003 | Buford | |
| 2003/0050837 A1* | 3/2003 | Kim | 705/14 |
| 2003/0126136 A1* | 7/2003 | Omoigui | 707/10 |
| 2003/0177063 A1* | 9/2003 | Currans et al. | 705/14 |
| 2003/0191689 A1 | 10/2003 | Bosarge | |
| 2004/0023644 A1 | 2/2004 | Montemer | |
| 2004/0039786 A1* | 2/2004 | Horvitz et al. | 709/207 |
| 2004/0059708 A1 | 3/2004 | Dean | |
| 2004/0107125 A1* | 6/2004 | Guheen et al. | 705/7 |
| 2004/0119740 A1 | 6/2004 | Chang | |
| 2004/0122811 A1 | 6/2004 | Page | |
| 2004/0261021 A1 | 12/2004 | Mittal | |
| 2005/0071224 A1* | 3/2005 | Fikes et al. | 705/14 |
| 2005/0182673 A1* | 8/2005 | Marzian et al. | 705/10 |
| 2005/0216335 A1* | 9/2005 | Fikes et al. | 705/14 |
| 2005/0216457 A1 | 9/2005 | Walther | |
| 2006/0161524 A1 | 7/2006 | Roy | |
| 2007/0106654 A1* | 5/2007 | Bookstaff | 707/4 |

FOREIGN PATENT DOCUMENTS

| | | |
|---|---|---|
| WO | WO 00/38399 A | 6/2000 |
| WO | WO 01/47264 A | 6/2001 |
| WO | WO 2004/0029759 | 4/2004 |
| WO | WO 2004/029759 | 4/2004 |
| WO | WO 2004/042525 | 5/2004 |
| WO | WO 2007/024868 A2 | 3/2007 |

OTHER PUBLICATIONS

Yahoo Block Internet Citation, [Online] (Jun. 18, 2005), XP-002413362 Retrieved from the Internet: URL:http://wwvv.seomoz.ort/bloqdetail.php?ID=206>, [retrieved on Jan. 3, 2007] the whole document.

Partial PCT Search Report PCT/US2005/023,495.

http://gmail.google.com, Jun. 16, 2004, retrived on Feb. 14, 2007 at http://archive.org/web/web.php by Canadian Patent Office.

Partial Canadian Patent Office Search Report 2,569,529.

Partial European Search Report EP 08 01 8481 Dated: Nov. 28, 2008.

Supplemental European Search Report EP 05 76 4461.9 Dated: Mar. 9, 2009.

* cited by examiner

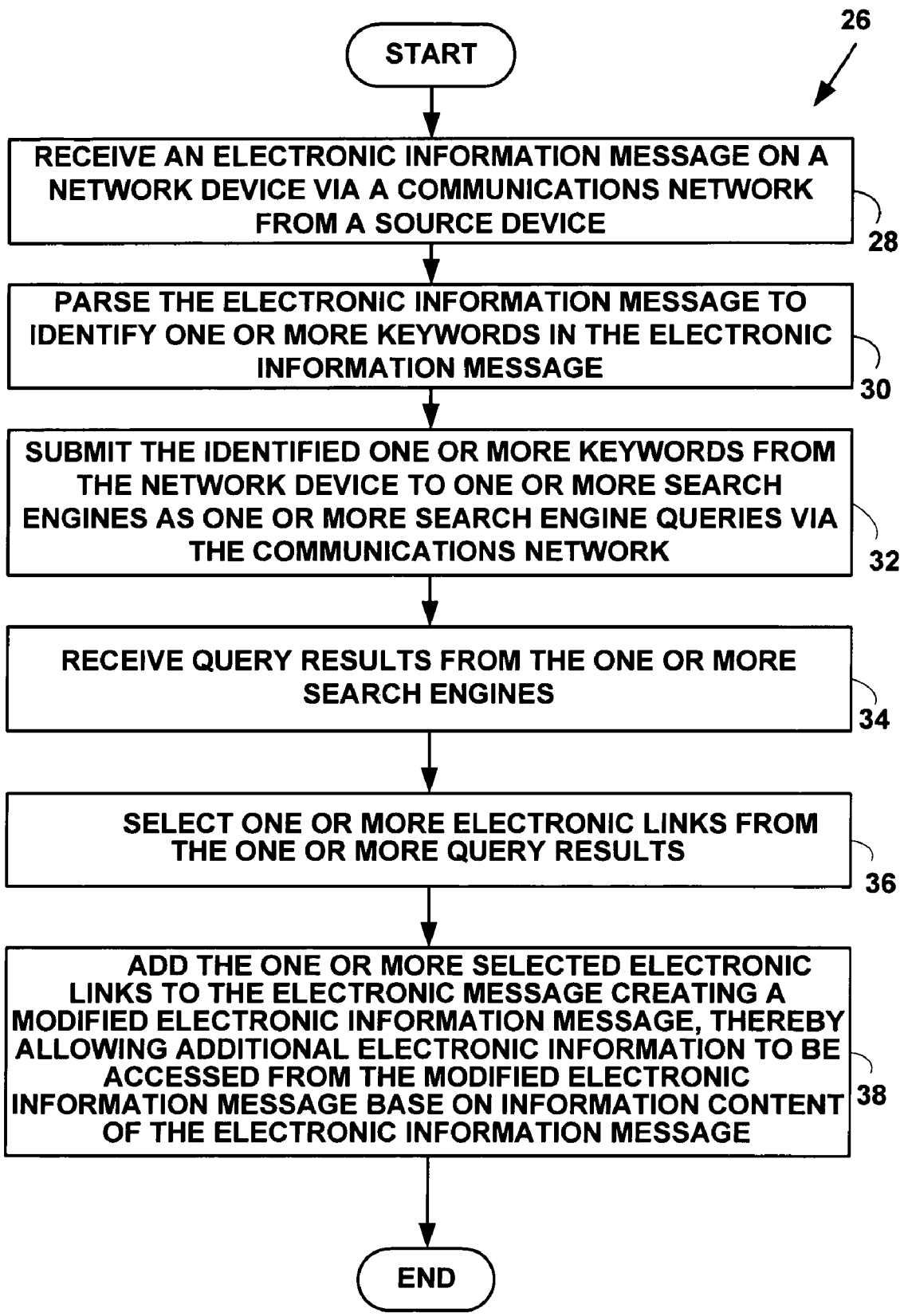

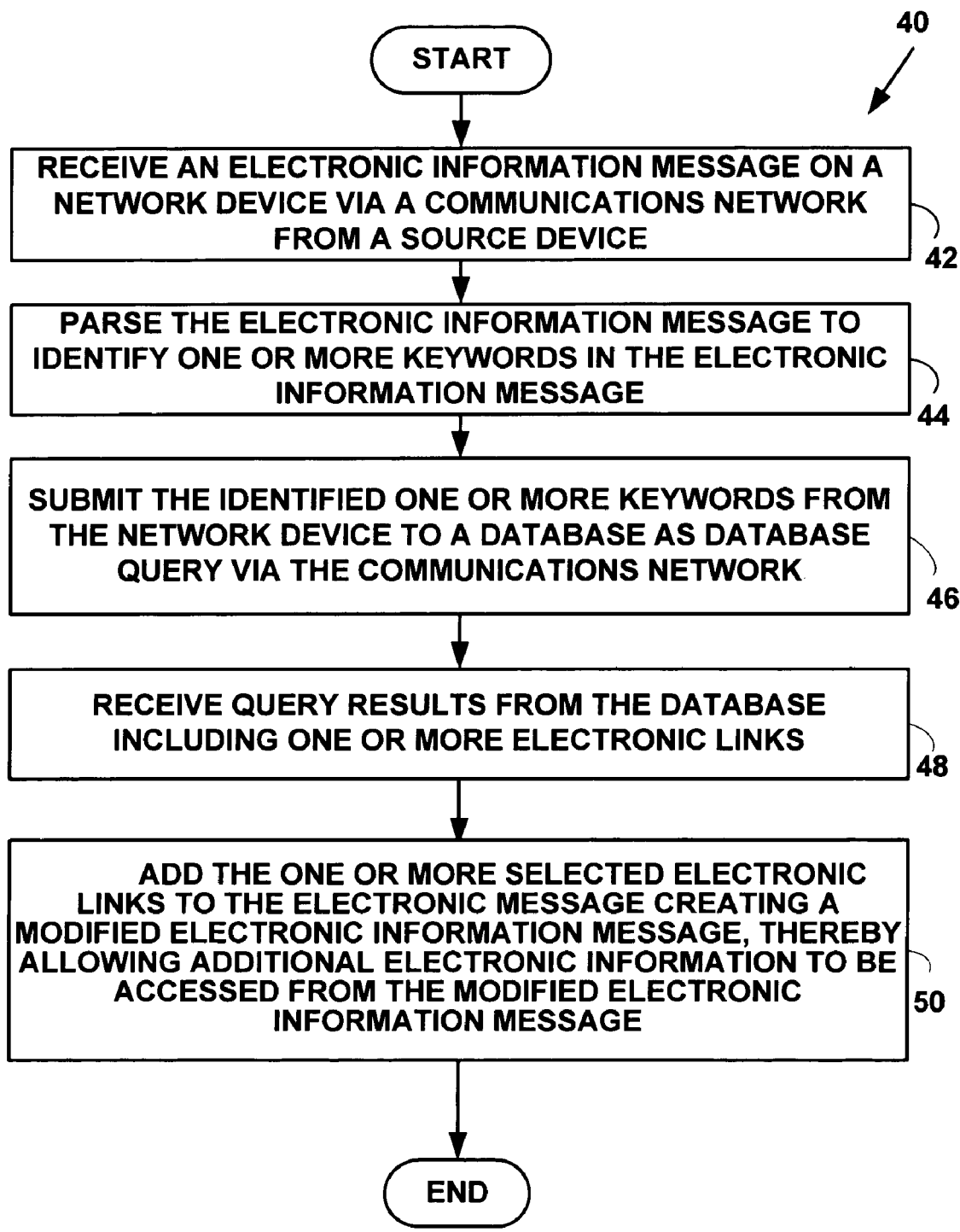

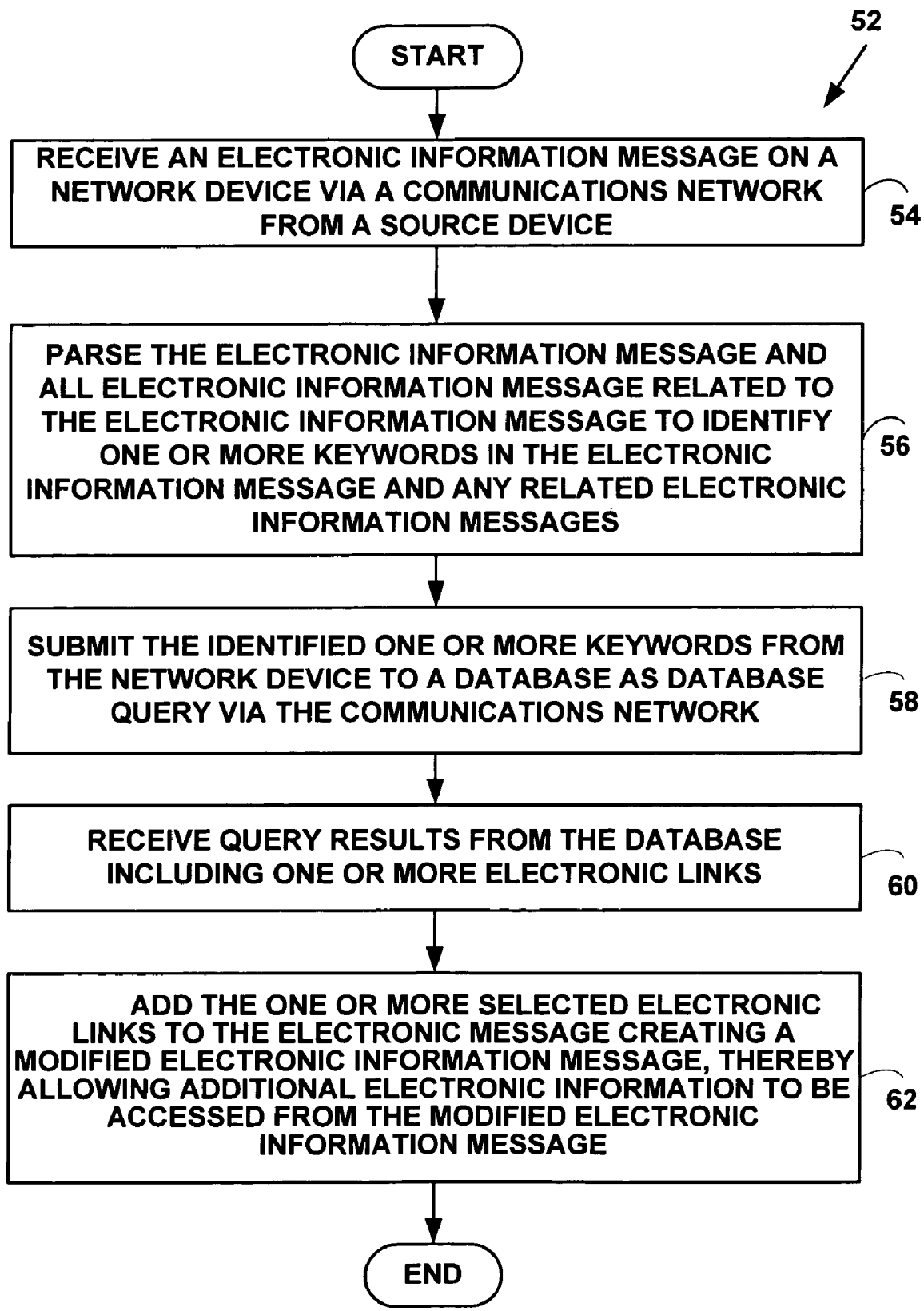

METHOD AND SYSTEM FOR AUTOMATED INTELLIGENT ELECTRONIC ADVERTISING

CROSS-REFERENCE TO RELATED APPLICATIONS

This application claims priority to U.S. Provisional Patent application 60/583,960, filed Jun. 29, 2004, the contents of which are incorporation by reference.

FIELD OF INVENTION

This application relates to automatic processing of electronic information. More specifically, it relates to a method and system for automatic electronic advertising.

BACKGROUND OF THE INVENTION

The Internet and World-Wide-Web have changed the way organizations conduct business. Virtually every organization has a web-site that provides information about the organization and a description of the goods and/or services an organization may offer. As is known in the art, a "web-site" is group of related mark-up language documents and associated graphics and multi-media files, scripts, and databases, etc. that are served up by a server on the World-Wide-Web via the Internet. Business organizations also provide an electronic commerce (e-commerce) interface that allows users to purchase goods and/or services from such organizations.

There are many different type of web-sites on a spectrum ranging from very simple to very complex. Designing, implementing and deploying a web-site requires knowledge of markup languages such as Hyper Text Markup Language (HTML), eXtensible Markup Language (XML), programming languages such as JAVA, C++, C#, computer graphics functionality, multi-media functionality, etc. A knowledge of communications protocols such as Hyper Text Transfer Protocol (HTTP), Transmission Control Protocol (TCP), Internet Protocol (IP), e-mail protocols such as Simple Mail Transfer Protocol (SMTP), e-commerce protocols, encryption and other security protocols and many other types of protocols for various kinds of web functionalities.

Commercial web-sites offer many different types of electronic advertisements. The advertisements typically include electronic links to advertiser's web-sites. There are many problems associated with designing, implementing and deploying advertising on a web-site.

Another problem is that many types of online advertising are considered spam. Another problem is that pop-up advertising is being block by operating systems such as Windows XP and add-on software. This pop-up blocking is becoming a standard feature in many operating systems. Another problem is that banner ads and pay-per-click ads are no longer an effective means of advertising online.

Electronic mail (e-mail) is one of the most common types of electronic information sent and received. E-mail is sent and received over public networks such as the Internet, and many private networks such as intranets, local area networks (LAN), etc.

Advertisers and other information providers are always looking for new ways to use existing technologies such as e-mail for advertising. There are many free e-mail services that routinely add advertising to user's e-mail as a condition of providing free e-mail. However, there is no easy way to add advertising to e-mail. In addition, general e-mail advertising is often considered spam.

One attempt to solve these problems is "Gmail" provided by Google. Gmail includes a web-interface that displays e-mail. Electronic advertising is displayed on the web-interface that corresponds in part to content of the e-mail.

This it is desirable to use e-mail and other types of electronic information messages for providing advertising and other types of electronic information.

SUMMARY OF THE INVENTION

In accordance with preferred embodiments of the invention, some of the problems associated with electronic advertising are overcome. A method and system for intelligent electronic advertising is presented.

The method and system parse electronic information messages (e.g., e-mail, instant messages, etc.) for keywords and make search engine queries or database queries for electronic links based on the identified keywords. The electronic links returned from search engine queries are added to the electronic information messages creating a modified electronic information message. This allows additional electronic information to be accessed from the modified electronic information message based on information content of the original electronic information message.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIG. 2 is a flow diagram illustrating a method for automated electronic information message processing;

FIG. 3 is a flow diagram illustrating a method for automated electronic information message processing; and FIG. 4 is a flow diagram illustrating a method for automatic electronic information message processing.

DETAILED DESCRIPTION OF THE INVENTION

Exemplary Electronic Information Message Processing System

Figure 1:
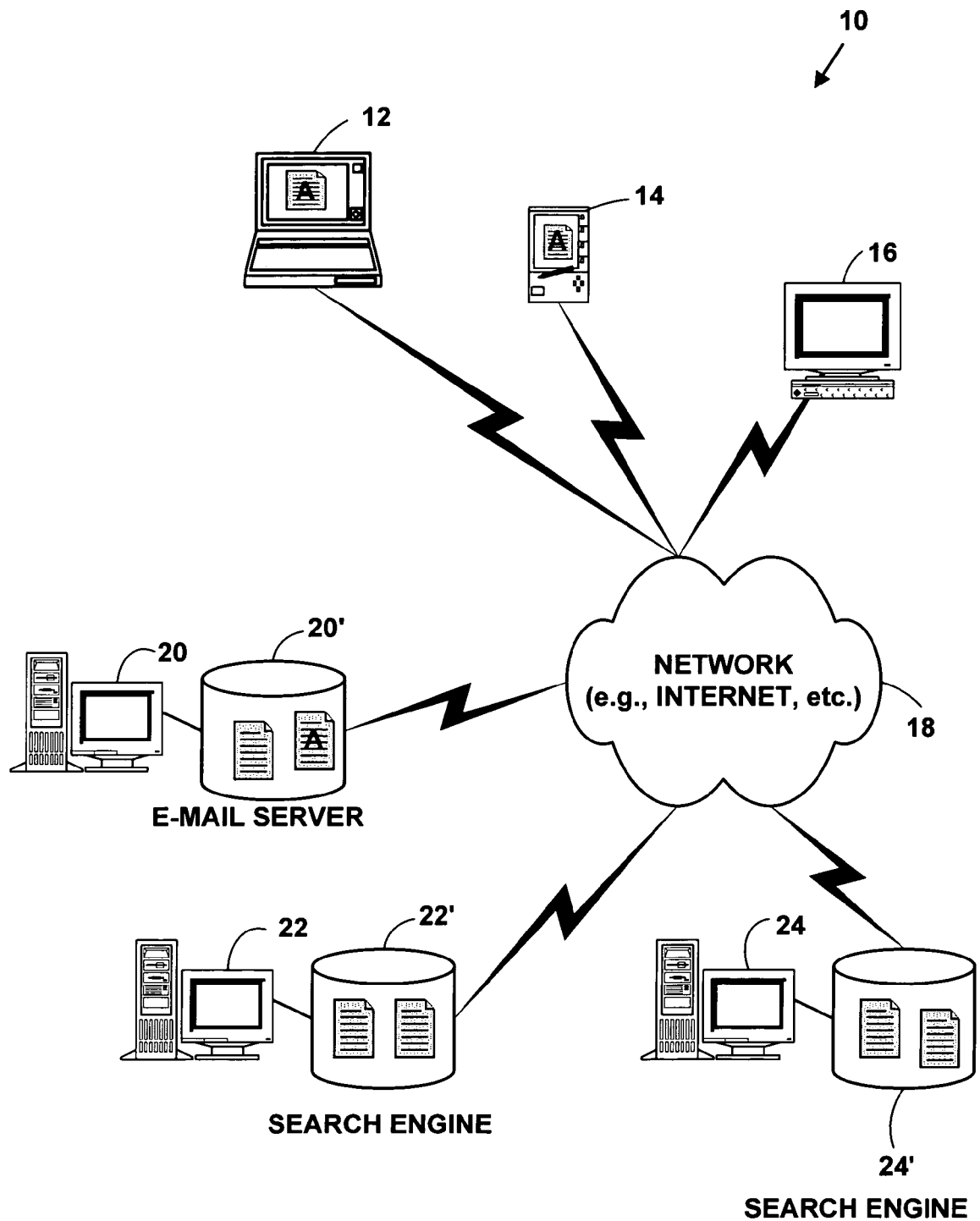
FIG. 1 is a block diagram illustrating an exemplary electronic information message processing system.

FIG. 1 is a block diagram illustrating an exemplary electronic information message processing system 10. The exemplary electronic information message processing system 10 includes, but is not limited to, one or more target devices 12, 14, 16 (only three of which are illustrated). The target devices 12, 14, 16 include, but are not limited to, non-mobile computers, wireless devices, laptop computers, mobile phones, personal information devices, personal digital/data assistants (PDA), hand-held devices, network appliances, Internet appliances, two-way pagers, etc. However, the present invention is not limited to these target electronic devices and more, fewer or others types of target electronic devices can also be used. The target devices 12, 14, 16 function as client devices in some instances and server devices in other instances.

The target devices 12, 14, 16 are in communications with a communications network 18. The communications network 18 includes, but is not limited to, the Internet, an intranet, a wired Local Area Network (LAN), a wireless LAN (WiLAN), a Wide Area Network (WAN), a Metropolitan Area Network (MAN), Public Switched Telephone Network (PSTN) and other types of communications networks 18 providing voice, video and data communications with wired or wireless communication protocols.

Plural server devices 20, 22, 24 (only three of which are illustrated) include one or more associated databases 20', 22', 24'. The plural network devices 20, 22, 24 are in communications with the one or more target devices 12, 14, 16 via the communications network 18. The plural server devices 20, 22, 24, include, but are not limited to, electronic mail (e-mail) servers, World Wide Web servers, Internet servers, file servers, other types of electronic information servers, and other types of server network devices (e.g., edge servers, firewalls, routers, gateways, etc.).

Preferred embodiments of the present invention include devices that are compliant with all or part of standards proposed by the Institute of Electrical and Electronic Engineers ("IEEE"), International Telecommunications Union-Telecommunication Standardization Sector ("ITU"), European Telecommunications Standards Institute (ETSI), Internet Engineering Task Force ("IETF"), U.S. National Institute of Security Technology ("NIST"), American National Standard Institute ("ANSI"), Wireless Application Protocol ("WAP") Forum, Data Over Cable Service Interface Specification (DOCSIS), Bluetooth Forum, or the ADSL Forum. However, network devices based on other standards could also be used. IEEE standards can be found on the World Wide Web at the Universal Resource Locator ("URL") "www.ieee.org." The ITU, (formerly known as the CCITT) standards can be found at the URL "www.itu.ch." ETSI standards can be found at the URL "www.etsi.org." IETF standards can be found at the URL "www.ietf.org." The NIST standards can be found at the URL "www.nist.gov." The ANSI standards can be found at the URL "www.ansi.org." DOCSIS documents can be found at the URL "www.cablemodem.com." Bluetooth Forum documents can be found at the URL "www.bluetooth.com." WAP Forum documents can be found at the URL "www.wap-forum.org." ADSL Forum documents can be found at the URL "www.adsl.com."

The target devices 12, 14, 16 include a protocol stack with multiple layers based on the Internet Protocol or Opens Systems Interconnection (OSI) reference model. The protocol stack includes, but is not limited to, Transmission Control Protocol (TCP), User Datagram Protocol (UDP), Internet Protocol (IP), Hypertext Transfer Protocol (HTTP), Simple Mail Transfer Protocol (SMTP), Post Office Protocol version 3 (POP3), Internet Mail Access Protocol (IMAP), instant-messaging (IM) and other protocols.

TCP provides a connection-oriented, end-to-end reliable protocol designed to fit into a layered hierarchy of protocols that support multi-network applications. For more information on TCP 58 see RFC-793, incorporated herein by reference.

UDP provides a connectionless mode of communications with datagrams in an interconnected set of networks. For more information on UDP see ITEF RFC-768, incorporated herein by reference.

IP is an addressing protocol designed to route traffic within a network or between networks. For more information on IP 54 see IETF RFC-791, incorporated herein by reference.

HTTP is a standard protocol for communications on the World Wide Web. For more information on HTTP, see IETF RFC-2616, incorporated herein by reference.

SMTP is a protocol for sending e-mail messages between devices including e-mail servers. For more information on SMTP, see IETF RFC-821 and RFC-2821, incorporated herein by reference.

POP3 is a protocol for a protocol used to retrieve e-mail from a mail server. For more information on POP3, see IETF RFC-1939, incorporated herein by reference.

IMAP is a protocol for retrieving e-mail messages from a server. For more information on IMAP, see IETF RFC-1730, incorporated herein by reference.

An Instant Message (IM) is a "short," real-time or near-real-time message that is sent between two or more end user devices such (computers, personal digital/data assistants (PDAs) mobile phones, etc.) running IM client applications. An IM is typically a short textual message. Examples of IM messages include America Online's Instant (AIM) messaging service, Microsoft Network (MSN) Messenger, Yahoo Messenger, and Lycos ICQ Instant Messenger, IM services provided by telecom providers such as T-Mobile, Verizon, Sprint, and others that provide IM services via the Internet and other wired and wireless communications networks. In one embodiment of the present invention, the IM protocols used meet the requirements of Internet Engineering Task Force (IETF) Request For Comments (RFC)-2779, entitled "Instant Messaging/Presence Protocol Requirements." However, the present invention is not limited to such an embodiment and other IM protocols not compliant with IETF RFC 2779 may also be used.

As is known in the art, the Internet Protocol reference model is a layered architecture that standardizes levels of service for the Internet Protocol suite of protocols. The Internet Protocol reference model comprises in general from lowest-to-highest, a link, network, transport and application layer.

As is known in the art, the OSI reference model is a layered architecture that standardizes levels of service and types of interaction for computers exchanging information through a communications network. The OSI reference model separates network device-to-network device communications into seven protocol layers, or levels, each building- and relying-upon the standards contained in the levels below it. The OSI reference model includes from lowest-to-highest, a physical, data-link, network, transport, session, presentation and application layer. The lowest of the seven layers deals solely with hardware links; the highest deals with software interactions at the application-program level.

An operating environment for the devices of the electronic information processing system 10 include a processing system with one or more high speed Central Processing Unit(s) ("CPU"), processors and one or more memories. In accordance with the practices of persons skilled in the art of computer programming, the present invention is described below with reference to acts and symbolic representations of operations or instructions that are performed by the processing system, unless indicated otherwise. Such acts and operations or instructions are referred to as being "computer-executed," "CPU-executed," or "processor-executed."

It will be appreciated that acts and symbolically represented operations or instructions include the manipulation of electrical signals by the CPU or processor. An electrical system represents data bits which cause a resulting transformation or reduction of the electrical signals, and the maintenance of data bits at memory locations in a memory system to thereby reconfigure or otherwise alter the CPU's or processor's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, optical disks, organic memory, and any other volatile (e.g., Random Access Memory ("RAM")) or non-volatile (e.g., Read-Only Memory ("ROM"), flash memory, etc.) mass storage system readable by the CPU. The computer readable medium includes cooperating or interconnected computer readable medium, which exist exclusively on the processing system or can be distributed among multiple interconnected processing systems that may be local or remote to the processing system.

Automatic Electronic Information Message Processing With Search Engine Queries

FIG. 2 is a flow diagram illustrating a Method 26 for automated electronic information message processing. At Step 28, an electronic information message is received on a network device via a communications network from a source device. At Step 30, the electronic information message is parsed to identify one or more keywords in the electronic information message. At Step 32, the identified one or more keywords are submitted from the network device to one or more search engines as one or more search engine queries via the communications network. At Step 34, query results are received from the one or more search engines. At Step 36, one or more electronic links are selected from the one or more query results. At Step 38, the one or more selected electronic links are added to the electronic message creating a modified electronic information message, thereby allowing additional electronic information to be accessed from the modified electronic information message based on the original content of the electronic information message.

In another embodiment, Method 26 may further include an additional Step 39 for sending the modified electronic information message from the network device to a destination device. However, present invention is not limited to such an embodiment Method 26 can be used without this additional Step 40.

Method 26 is illustrated with an exemplary embodiment. However, the present invention is not limited to such an exemplary embodiment and other embodiment can be used to practice the invention.

In such an exemplary embodiment at Step 28, an e-mail message is received on an e-mail server 20 via a communications network 18 from a source device 12. The source device 12 is sending the e-mail to a destination device 14. The e-mail server 20 includes, but is not limited to, an e-mail server using SMTP, POP3, IMAP or other protocols. In another embodiment, an instant message is received and processed. However, the present invention is not limited to these protocols and other protocols can also be used to practice the invention.

At Step 30, the e-mail message is parsed to identify one or more keywords in the e-mail message. In one embodiment, the one or more keywords include advertising keywords stored in a database 20'. In another embodiment, the one or more keywords include keywords dynamically generated using information theory to decide relevant keywords (e.g., automatically eliminate words such as the, and, to, etc.) However, the present invention is not limited to such embodiments and other embodiments can also be used to practice the invention. The e-mail message can parsed to identify keywords for virtually any purpose.

At Step 32, the identified one or more keywords are submitted from the e-mail server 20 to one or more search engines 22, 24 as one or more search engine queries via the communications network 18. For example, the one or more identified keywords may be submitted to public search engines such as Google, Lycos, Yahoo, Galaxy, etc. on the Internet. The one or more identified keywords may also be submitted to one or more private search engines on an intranet or other private or public networks. The one or more identified keywords may also be submitted to one or more private search engines cached directly in memory on a network device that are used without accessing communications network 18.

On advantage of using search engine queries is that electronic links obtained should always be up to date as search engines spend a lot of time and resources making sure the electronic links are accurate and not broken.

The one or more identified keywords may include advertising keywords. For example, the advertising keywords may include those related to travel, such as hotel, ticket, airport, arrive, depart, etc. In one embodiment, the one or more identified keywords may be used directly for the search engine queries (e.g., hotel). In another embodiment, the one or more identified keywords may be mapped to one or more other sets of related keywords that are used to make the search engine queries (e.g., travel→hotel, airplane ticket, rental car, etc.). In another embodiment, two or more identified keywords may be mapped to a single keyword (e.g., hotel, airplane ticket, car rental→travel).

In another embodiment, the one or more identified keywords may include non-advertising keywords, such as public interest, public service or general information keywords (e.g., school information, community events, public safety, etc.). However, the present invention is not limited to these embodiments and other embodiments may be used to practice the invention.

At Step 34, query results are received from the one or more search engines 22, 24. The query results typically include a list of electronic links related to the identified keyword used to generate the search engine query. The list of electronic links include Hyper Text Markup Language (HTML), eXtensible Markup Language (XML) or other types of electronic links. The electronic links also typically include a URL (e.g., www.hotels.com) used to allow electronic linking to another web-site.

Table 1 illustrates a portion of an exemplary portion of a query search result from the Google search engine for the keyword "hotel."

TABLE 1 hotels.com - The best prices at the best places. Guaranteed.
Find the Lowest Hotel Rates Guaranteed! From Luxury Hotels to Budget Accommodations. Hotels.Com has the Best Deals and Discounts for Hotel Rooms Anywhere.
www.hotels.com/ - 89k - Jun. 19, 2005.

At Step 36, one or more electronic links are selected from the one or more query results. In one embodiment, the electronic links selected are selected from a top of list returned from a search engine query (e.g., one or more of the first five to ten entries returned). In another embodiment, the electronic links selected are selected by processing the query results and applying a pre-determined method to select electronic links from throughout the search query results based on pre-determined conditions (e.g. such as payment of advertising fees, etc.).

In another embodiment, one or more of electronic links selected are selected based on agreements with advertisers. For example, query results for the identified keyword "hotel" may return a list of electronic links to 1000 providers of hotel rooms. An advertiser may desire to have an electronic link to their web-site be used and given priority over those returned by the query results. However, the present invention is not limited to these embodiment and other embodiments can also be used to practice the invention.

At Step 38, the one or more selected electronic links are added to the electronic message creating a modified e-mail message, thereby allowing additional electronic information to be accessed from the modified e-mail message. The electronic links include electronic links for linking directly to another web-site (e.g., a hotel room booking web-site), a web-site including links to other web-sites, to initiate a static search engine query (e.g., a static URL for a search engine query), to initiate a dynamic search engine query and other types of electronic links.

For example, if an e-mail message included the identified keyword "hotel," one or more electronic links are added to the e-mail message to web-sites that provide information on booking hotel rooms.

Table 2 illustrates and exemplary e-mail message automatically processed with Method 26. The identified keywords include "Delta" and "hotel."

TABLE 2

Steve,
    Maybe we could go Delta but I am not sure. We definitely will
    need a hotel.
Blake In one embodiment, additional text and/or graphical information is automatically created and the electronic link is added to the e-mail message at a top, bottom or side of the e-mail message. In such an embodiment, the electronic link is added to the e-mail message in association with the identified keywords. The additional text and/or graphics may include banner advertisements, graphical advertisements and other types of advertisements that allow a user to select (e.g., click on) the advertisement and receive additional information via the electronic link. In another embodiment, all or a portion of text return from a search engine query is used along with the electronic link.

Table 3 illustrates an exemplary modified e-mail message modified at Step 38. The identified keywords include "Delta" and "hotel." The electronic link is added to the bottom of the original e-mail message to create a modified e-mail message. In one embodiment, the electronic link includes all text added to the modified e-mail message. In another the electronic link includes only a portion of text added to the modified e-mail message.

TABLE 3

Steve,
    Maybe we could go Delta but I am not sure. We definitely will
    need a hotel.
Blake Find the Lowest Hotel Rates Guaranteed! From Luxury Hotels to
Budget Accommodations. Hotels.Com has the Best Deals and Discounts
for Hotel Rooms Anywhere. www.hotels.com In one embodiment, Step 38 includes modifying one or more characteristics of the identified keyword to distinguish the identified keyword from other portions of the electronic information message. In another embodiment, Step 38 includes modifying a font color, a font size, a font bolding, a font underlining, or a font italicizing of a font used to enhance display of the identified keyword in the e-mail message.

For example, the identified keyword "hotel" appears as normal black and white text in the e-mail message. At Step 38, the identified keyword "hotel" is modified to include a different font color (e.g., blue) a different font bolding (e.g., bold) and a different font underlining (e.g., underlined). In this example, the identified keyword "hotel" becomes hotel. The modified keyword may include an electronic link to www.hotels.com.

Table 4 illustrates exemplary HTML code for the modified keyword hotel added to the e-mail message including bolding, underling and an electronic link to www.hotels.com. However, the present invention is not limited to such HTML code and other types of electronic links can be used to practice the invention.

TABLE 4

<A href="http://www.hotels.com"><B><U>hotel</B></U></A>

The identified keyword "Delta" is processed and displayed in a similar manner to include an electronic link for www.delta.com. (i.e., the keyword Delta is illustrated as being bolded and underlined).

Table 5 illustrates and exemplary e-mail message modified at Step 38. The identified keywords include "Delta" and "hotel."

TABLE 5

Steve,
    Maybe we could go Delta but I am not sure. We definitely will need
    a hotel.
Blake Table 6 illustrates a combination of adding electronic links and modifying identified keywords. Various combinations thereof of adding electronic links and modifying electronic keywords can be used to practice invention.

TABLE 6

Steve,
    Maybe we could go Delta but I am not sure. We definitely will
    need a hotel.
Blake Find the Lowest Hotel Rates Guaranteed! From Luxury Hotels to Budget
Accommodations. Hotels.Com has the Best Deals and Discounts for
Hotel Rooms Anywhere. www.hotels.com.

In another embodiment, the same electronic link is added to repeating occurrences of an identified keyword. In another embodiment, different electronic links are added to repeating occurrences of the identified keywords. For example, if the word "hotel" appeared in the e-mail message twice, in the first embodiment, the same electronic link to the same web-site would be added to the e-mail message. In the second embodiment, a first electronic link to a first web-site is added to the first occurrence of the word "hotel" and a second different electronic link for a different hotel book web-site is added to the second occurrence of the word "hotel."

In another embodiment, Method 26 may further include an additional Step 39 for sending the modified e-mail message from the e-mail server 20 to a destination device 14.

In various embodiments, Method 26 is used to parse e-mail messages either at the e-mail server 20 or on a target device 12, 14, 16, or anywhere in the e-mail chain on the e-mail server 20 or in an e-mail box on the target device 12, 14, 16. Chains of IM messages can also be parsed.

If there were back and forth responses to the exemplary e-mail illustrated in Tables 2, 3, 5 and 6, Method 26 could be used to parse the whole e-mail chain. In one embodiment, the e-mail can be parsed anywhere in a communications path anywhere on any device the e-mail passes through on the communications network 18. For example, suppose a response to the exemplary e-mail include a discussion about rental cars and restaurants. These additional keywords would be identified and electronic links added to the e-mail chain in one or more places (e.g., source device 12, e-mail server 20, other servers on the communications network 18, gateways, routers, bridge, destination device 14, etc.) as well as the original identified keywords for "hotel" and "Delta." In addition, the parsing can include parsing e-mail message with a same or similar subject line, by a same sender, sent during a specified time period and based on a large number of other characteristics used to identify e-mails or e-mail senders.

In one embodiment computer software is added to an e-mail server 20 to practice Method 26. In another embodiment, computer software is added to a target device 12, 14, 16 to practice Method 26.

In one embodiment, when a user selects an electronic link in the modified electronic information message, additional electronic information is displayed within the electronic information message itself. In another embodiment, when the electronic link is selected, a new window or other viewing area is created to display the additional electronic information. However, the present invention is not limited to such an exemplary embodiment and other embodiment can be used to practice the invention.

Automatic Electronic Information Message Processing With Database Queries

FIG. 3 is a flow diagram illustrating a Method 40 for automated electronic information message processing. At Step 42, an electronic information message is received on a network device via a communications network from a source device. At Step 44, the electronic information message is parsed to identify one or more keywords in the electronic information message. At Step 46, the identified one or more keywords are submitted as a query to a database. The database includes electronic links for electronic information suppliers who entered into a pre-determined agreement to provide electronic links. At Step 48, a database query result is returned from the database including one or more electronic links. At Step 50, the one or electronic links are added to the electronic information message creating a modified electronic information message, thereby allowing additional electronic information to be accessed from the modified electronic information message.

Method 40 is illustrated with an exemplary embodiment. However, the present invention is not limited to such an exemplary embodiment and other embodiment can be used to practice the invention.

In such an exemplary embodiment At Step 42, an e-mail message is received on an e-mail server 20 via a communications network 18 from a source device 12. At Step 44, the e-mail message is parsed to identify one or more keywords in the e-mail message. In one embodiment, the keywords are parsed using a list of keywords stored in database 20'. However, the present invention is not limited to this embodiment and other embodiments can also be used to practice the invention (e.g., searching for keywords based on information theory, etc.).

At Step 46, the identified one or more keywords are submitted as a query to a database 20'. The database 20' includes one or more electronic links for electronic information suppliers who have pre-determined agreement to provide electronic links. For example, the database 20' includes electronic links to x-different travel ticket booking web-sites. The travel ticket booking web-sites have paid a fee to allow their electronic links to be provided and inserted into e-mail message that flow through the e-mail server 20 any time an e-mail message includes the keyword "travel."

In one embodiment, the electronic links are provided in a pre-determined priority order. An identified keyword of "hotel" is used. For example, a first hotel room booking web-site pays a largest fee to have its electronic link provided first for every database query for a pre-determined time period. Second and subsequent hotel room booking web-sites pay smaller fees to have their electronic links provided after the first hotel room booking web-site.

Table 7 illustrates electronic links provided in a pre-determined priority order (e.g., Orbitz, Travelocity, Expedia).

TABLE 7

Steve,
    Maybe we could go Delta but I am not sure. We definitely will
    need a hotel.
Blake Sponsored Listings:
    Hotel
    Search by Geopgraphy and Hotel Find it at Orbitz Now!
    www.Orbitz.com
    Up to 70% off Hotels.
    Find Last Minute Room Deals. Travelocity Can Save you Money.
    www.travelocity.com
    Find the Hotel You Want
    Hot Deals at Over 9,000 Hotels Search Expedia & Save!
    www.expedia.com In another embodiment, Table 7 may illustrates multiple results obtained directly from a search engine or database query.

In another embodiment, a first hotel room booking web-site's electronic link may be added to every instance of the identified keyword "hotel." In another embodiment, the first hotel room booking web-site's electronic link may be added to a first instance of the identified keyword hotel, a second hotel room booking web-site may be added to a second occurrence of the identified keyword hotel, etc. In another embodiment, the first hotel room booking web-site may pay a pre-determined number of identified keyword occurrences (e.g., the first five occurrences in every e-mail, the first occurrence in every other e-mail, etc.).

In another embodiment, the electronic links are provided in a random order. In another embodiment, the electronic links are provided in a pre-determined order (e.g., a round-robin order, a pre-determined pattern repeating order, etc.).

In another embodiment, at Step 46, the database queries may also further include one or more queries to one or more search engines 22, 24. In such an embodiment, the database query results may include a combination of electronic links from both the database 20' and the search engine 22, 24 query results. In such an embodiment, the search engine queries may be used to update out of date or broken electronic link stored in the database 20'.

In another embodiment, an identified keyword may be mapped into plural related keywords (e.g., car rental→Hertz, Avis, Alamo, Dollar, etc.). Plural identified keywords may be mapped into one keyword (e.g., Hertz, Avis, Alamo, etc.→car rental).

However, all of these embodiments are exemplary only and other embodiments and other priority and non-priority methods can also be used to practice the invention.

At Step 48, a database query result is returned from the database 20' including one or more electronic links. The database query result may also include query results from one or more search engines as was described above. At Step 48, the database query result may also include a mapping from a first identified keyword to plural other related keywords. For example, the identified keyword "travel," may be mapped to plural other keywords "hotel rooms, rental cars and airline tickets, etc."

At Step 50, the one or more electronic links are added to the e-mail message creating a modified e-mail message, thereby allowing additional electronic information to be accessed from the modified e-mail message based on information content in the e-mail message (i.e., the original e-mail message). A user can then select (e.g., click on the electronic link) and be provided with additional information associated with the keywords.

In another embodiment, at Step 50 query results are integrated into an e-mail message as a "search electronic link" (i.e., an electronic link that triggers a new search) that is viewed by a user to allow the user to be able to do searches right from the e-mail by selecting an electronic link with the search terms embedded in the electronic link.

Table 8 illustrates such an embodiment. For example, the search electronic link "Hotels" includes query results for hotels, (e.g., Orbitz, Travelocity, Expedia, etc.). The search electronic link "Airlines" includes query results for airlines (e.g., Delta, United, etc.).

TABLE 8

Steve,
    Maybe we could go Delta but I am not sure. We definitely will need a hotel.
Blake
Hotels | Airlines | Rental Cars | Restaurants In one embodiment the electronic link for "Hotels" may include a static search engine query (e.g., http://www.google.com/search?biw=968&h1=en&q=hotels). Such an electronic link will provide a search engine query (e.g., on Google) when the electronic link is selected in the electronic information message.

FIG. 4 is a flow diagram illustrating a Method 52 for automated electronic information message processing. At Step 54, an electronic information message is received on a network device via a communications network from a source device. At Step 56, the electronic information message is parsed and all electronic information messages related to the electronic information message are parsed to identify one or more keywords in the electronic information message and any related electronic information messages. (e.g., the electronic information message can be parsed anywhere in a communications path anywhere on any device the electronic information message passes through on the communications network). At Step 58, the identified one or more keywords are submitted from the network device to one or more search engines as one or more search engine queries via the communications network. At Step 60, query results are received from the one or more search engines. At Step 62, one or more electronic links are selected from the one or more query results. At Step 64, the one or more selected electronic links are added to the electronic message creating a modified electronic information message, thereby allowing additional electronic information to be accessed from the modified electronic information message based on information content of the electronic information message.

The methods and systems described herein can also be used as another innovative way of driving traffic to contracted, bided, sponsored or free listing services, search engines or web-sites.

It should be understood that the architecture, programs, processes, methods and systems described herein are not related or limited to any particular type of computer or network system (hardware or software), unless indicated otherwise. Various types of general purpose or specialized computer systems may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the steps of the flow diagrams may be taken in sequences other than those described, and more or fewer elements may be used in the block diagrams.

While various elements of the preferred embodiments have been described as being implemented in software, in other embodiments hardware or firmware implementations may alternatively be used, and vice-versa.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A method for automatically processing electronic information messages, comprising:
   automatically via a software module receiving an electronic information message on a network device with one or more processors via a communications network from a source network device with one or more processors;
   automatically via the software module parsing the electronic information message to identify one or more keywords in the electronic information message, wherein the identified one or more keywords include keywords include advertising keywords stored in a database, non-advertising keywords such as public interest keywords and keywords dynamically generated using information theory to decide relevant keywords;
   automatically via the software module mapping a selected single identified keyword into a plurality of related keywords, or mapping a plurality of selected identified keywords into a single keyword before submitting the one or more queries to one or more search engines;
   automatically via the software module submitting the identified one or more keywords from the network device to the one or more search engines as one or more search engine queries via the communications network, wherein the one or more search engines include one or more publicly available search engines and one or more privately available search engines;
   automatically via the software module receiving query results from the one or more search engines;
   automatically via the software module selecting one or more electronic links from the one or more query results, wherein the one or more electronic links are selected based on pre-determined conditions, wherein one of the pre-determine conditions includes fee agreements with advertisers and wherein the electronic links include electronic links for linking directly to another information site on the communications network, for initiating a static search engine query and for initiating a dynamic search engine query;

automatically via the software module adding the one or more selected electronic links to the electronic message creating a modified electronic information message, thereby allowing additional electronic information to be accessed from the modified electronic information message based on information content of the electronic information message, wherein a same selected electronic link is added to repeating occurrences of an identified keyword and wherein different selected electronic links are added to repeating occurrences of the identified keyword.

2. The method of claim 1 further comprising a computer readable medium having stored therein instructions for processing the steps of the method.

3. The method of claim 1 wherein the electronic message is an electronic mail (e-mail) message or an instant message (IM).

4. The method of claim 1 wherein the electronic links include mark-up language electronic links.

5. The method of claim 1 wherein the mark-up language electronic links include Hyper Text Markup Language (HTML) electronic links or Extensible Markup Language (XML) electronic links.

6. The method of claim 1 wherein the one or more keywords include advertising keywords.

7. The method of claim 1 wherein the communications network includes an intranet, Internet, a local area network (LAN) or a wide area network (WAN).

8. The method of claim 1 wherein the parsing step includes parsing the electronic information message for advertising keywords.

9. The method of claim 1 further comprising:
sending the modified electronic information message from the network device to a destination device.

10. The method of claim 1 wherein the adding step comprises:
adding an electronic link in the electronic information message wherein the electronic link includes a search string query that provides search engine results when selected.

11. The method of claim 1 wherein the adding step includes adding a search electronic link that provides a list of electronic links returned from the search engine query results relating to an identified keyword.

12. The method of claim 1 wherein the modifying step includes modifying a font color, a font size, a font bolding, a font underlining, or a font italicizing of a font for enhancing display the identified keyword in the electronic information message.

13. The method of claim 1 wherein the parsing step includes parsing a current electronic information message and one or more other related electronic information messages in a chain of related electronic information messages.

14. The method of claim 13 wherein the one or more related electronic information messages include a chain of related e-mail messages or instant messages.

15. The method of claim 14 wherein the server device is an e-mail server.

16. The method of claim 1 wherein the network device is a server device.

17. The method of claim 1 wherein the network device is a client device comprising a computer, personal digital/data assistant (PDA), mobile phone, non-mobile phone, two-way pager or an Internet appliance.

18. A method for automatically providing electronic advertising, comprising:
automatically via a software module receiving an electronic mail (e-mail) message on a server network device with one or more processors via a communications network from a source network device with one or more processors:
automatically via the software module parsing the e-mail message to identify one or more advertising keywords and one or non-advertising public interest keywords, if any, in the e-mail message, wherein the identified one or more keywords include keywords include advertising keywords stored in a database, non-advertising public interest keywords and keywords dynamically generated using information theory to decide relevant keywords and wherein identified keywords are mapped into a plurality of related advertising keywords that are also used for searching;
automatically via the software module mapping a selected single identified keyword into a plurality of related keywords, or mapping a plurality of selected identified keywords into a single keyword before submitting the one or more queries to one or more search engines;
automatically via the software module submitting the identified one or more advertising keywords or non-advertising public interest keywords from the server network device to one or more search engines as one or more search engine queries via the communications network, wherein the one or more search engines include one or more publicly available search engines and one or more privately available search engines;
automatically via the software module receiving query results from the one or more search engines;
automatically via the software module selecting one or more electronic links from the one or more query results, wherein the one or more electronic links are selected based on pre-determined conditions, wherein one of the pre-determine conditions includes fee agreements with advertisers and wherein the electronic links include electronic links for linking directly to another information site on the communications network, for initiating a static search engine query and for initiating a dynamic search engine query; and
automatically via the software module adding the one or more selected electronic links to the advertising keywords or public interest keywords in the e-mail message creating a modified e-mail message, thereby allowing advertising or public interest information to be accessed from the modified e-mail message based on information content of the e-mail message, wherein a same selected electronic link is added to repeating occurrences of an identified keyword and wherein different selected electronic links are added to repeating occurrences of the identified keyword.

19. The method of claim 18 further comprising a computer readable medium having stored therein instructions for processing the steps of the method.

20. The method of claim 18 further comprising:
sending the modified e-mail message from the server network device to a destination network device with one or more processors.

21. A method for automatically processing electronic information messages, comprising:
automatically via the software module receiving an electronic information message on a network device with one or more processors via a communications network from a source network device with one or more processors:
automatically via the software module parsing the electronic information message to identify one or more keywords in the electronic information message, wherein the identified one or more keywords include keywords include advertising keywords stored in a database, non-advertising keywords and keywords dynamically generated using information theory to decide relevant keywords;

automatically via the software module submitting the identified one or more keywords as a query to one or more search engine databases associated with one or more search engines via a communications network, wherein the one or more search engine databases include one or more electronic links for one or more electronic information suppliers who entered into a pre-determined agreement to provide electronic links via the one or more search engines, wherein the one or more search engines include one or more publicly available search engines and one or more privately available search engines and wherein identified keywords are mapped into a plurality of related advertising keywords and non-adverting keywords that are also used for searching;

automatically via the software module returning a database query result from the one or more search engine databases including one or more electronic links wherein the one or more electronic links are selected based on pre-determined conditions, wherein one of the pre-determine conditions includes fee agreements with advertisers, wherein the electronic links include electronic links for linking directly to another information site on the communications network, for initiating a static search engine query and for initiating a dynamic search engine query and wherein the database query results may also include a mapping from a first identified keyword to a plurality of other related keywords; and automatically via the software module adding the one or electronic links to the electronic information message creating a modified electronic information message, thereby allowing additional electronic information to be accessed from the modified electronic information message based on information content of the electronic information message.

22. The method of claim 21 further comprising a computer readable medium having stored therein instructions for processing the steps of the method.

23. The method of claim 21 wherein the returning step includes returning a search engine database query with one or more electronic links provided based on priority order for which an electronic information provider pays a pre-determined fee.

24. The method of claim 21 wherein the returning step includes returning a search engine database query with one or o more links provided based on a random or round-robin ordering.

25. The method of claim 21 wherein the submitting step further includes submitting the identified one or more keywords to one or more search engines as one or more search engine queries via the communications network.

26. The method of claim 21 wherein the submitting step includes mapping a single identified keyword into a plurality of related keywords or mapping a plurality of identified keywords into a single keyword before submitting the database query.

27. A method for automatically processing electronic information messages, comprising:

automatically via a software module receiving an electronic information message on a network device with one or more processors via a communications network from a source network device with one or more processors;

automatically via the software module parsing the electronic information message and all electronic information messages related to the electronic information message to identify one or more keywords in the electronic information message and any related electronic information messages, wherein the any related messages include a plurality of related electronic information messages connected together and accessible from the electronic information message and to all the related messages;

automatically via the software module submitting the identified one or more keywords from the network device to one or more search engines as one or more search engine queries via the communications network, wherein the identified one or more keywords include keywords include advertising keywords stored in a database, non-advertising keywords such as public-interest keywords and keywords dynamically generated using information theory to decide relevant keywords and wherein identified keywords are mapped into a plurality of related advertising keywords that are also used for searching;

automatically via the software module receiving query results from the one or more search engines;

automatically via the software module selecting one or more electronic links from the one or more query results, wherein the one or more electronic links are selected based on pre-determined conditions, wherein one of the pre-determine conditions includes fee agreements with advertisers and wherein the electronic links include electronic links for linking directly to another information site on the communications network, for initiating a static search engine query and for initiating a dynamic search engine query; and automatically via the software module adding the one or more selected electronic links to the electronic message creating a modified electronic information message, thereby allowing additional electronic information to be accessed from the modified electronic information message based on information content of the electronic information message, wherein a same selected electronic link is added to repeating occurrences of an identified keyword and wherein different selected electronic links are added to repeating occurrences of the identified keyword.

28. The method of claim 27 further comprising a computer readable medium having stored therein instructions for processing the steps of the method.

29. An electronic information processing system with one or more processors and a memory with a plurality of software modules stored in the memory being executed by the one or more processors, comprising in combination:

a parsing module for parsing an electronic information message to identify one or more keywords in the electronic information message, wherein the identified one or more keywords include keywords include advertising keywords stored in a database, non-advertising keywords such as public-interest keywords and keywords dynamically generated using information theory to decide relevant keywords and wherein identified one or more keywords are mapped into a plurality of related advertising keywords that are also used for searching and for automatically via the software module mapping a selected single identified keyword into a plurality of related keywords, or mapping a plurality of selected identified keywords into a single keyword before submitting the one or more queries to one or more search engines;

a query module for submitting the identified one or more keywords from to one or more search engines as one or more search engine queries via a communications network, for receiving one or more search engine query results from the one or more search engine queries, wherein the identified one or more keywords include keywords include advertising keywords stored in a database and keywords dynamically generated using information theory to decide relevant keywords and wherein;

a selection module for selecting one or more electronic links from the one or more search engine queries, wherein the one or more electronic links are selected based on pre-determined conditions, wherein one of the pre-determine conditions includes fee agreements with advertisers and wherein the electronic links include electronic links for linking directly to another information site on the communications network, for initiating a static search engine query and for initiating a dynamic search engine query; and a modifying module for adding the one or more selected electronic links to the electronic message creating a modified electronic information message, thereby allowing additional electronic information to be accessed from the modified electronic information message based on information content from the electronic information message, wherein a same selected electronic link is added to repeating occurrences of an identified keyword and wherein different selected electronic links are added to repeating occurrences of the identified keyword.

* * * * *